R. P. MOODIE.
FURNACE.
APPLICATION FILED NOV. 26, 1920.

1,417,095.

Patented May 23, 1922.

Robert P. Moodie
INVENTOR.
BY E. H. Bond
ATTORNEY.

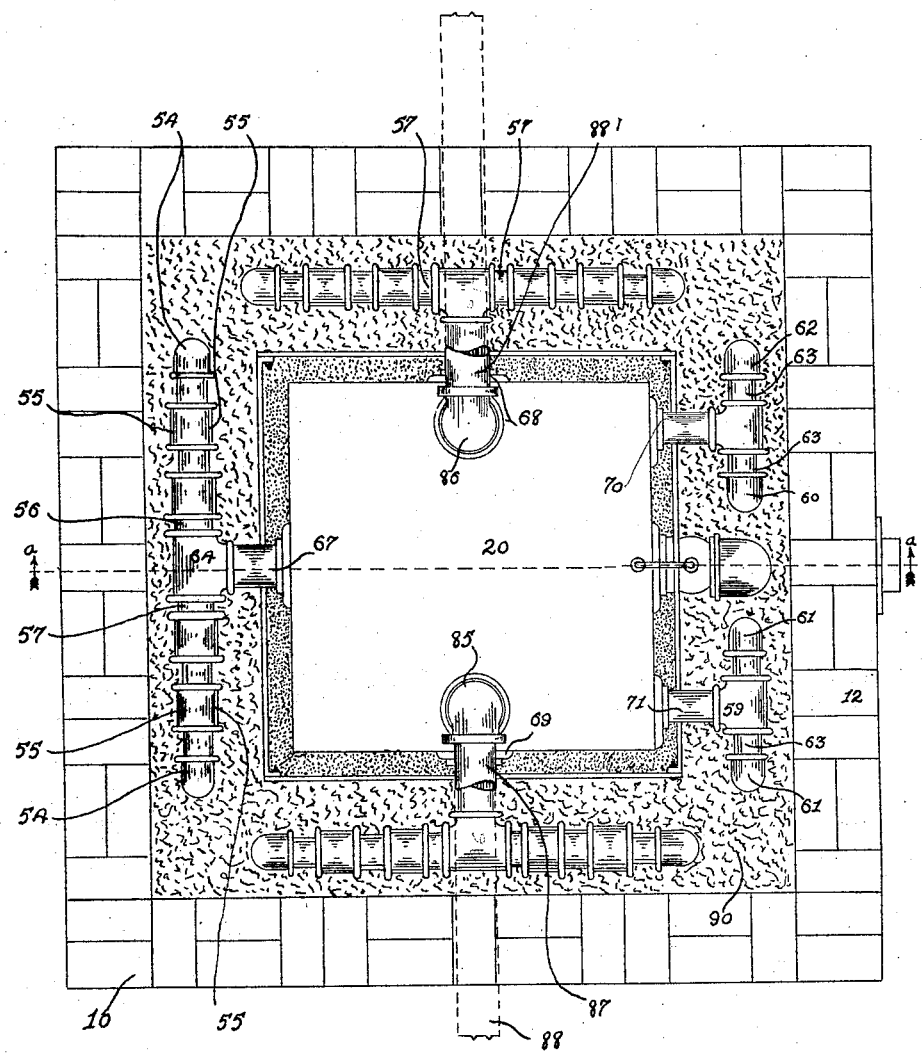

R. P. MOODIE.
FURNACE.
APPLICATION FILED NOV. 26, 1920.

1,417,095.

Patented May 23, 1922.

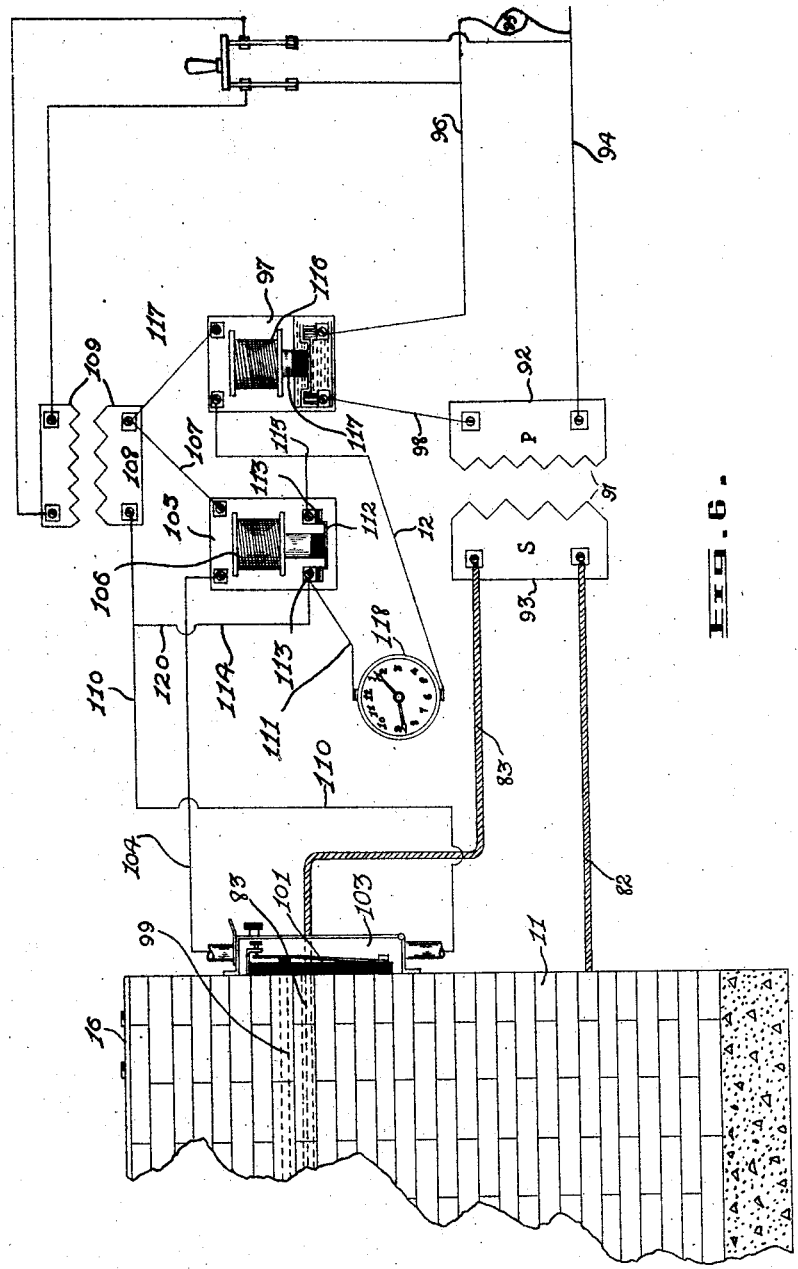

UNITED STATES PATENT OFFICE.

ROBERT P. MOODIE, OF OTTAWA, ONTARIO, CANADA, ASSIGNOR OF ONE-THIRD TO WILLIAM HENRY McINTYRE AND ONE-THIRD TO ADOLPHE ALFRED DION, OF OTTAWA, ONTARIO, CANADA.

FURNACE.

1,417,095.  Specification of Letters Patent.  Patented May 23, 1922.

Application filed November 26, 1920. Serial No. 426,573.

*To all whom it may concern:*

Be it known that I, ROBERT P. MOODIE, a citizen of the Dominion of Canada, residing at Ottawa, in the county of Carleton and Province of Ontario, have invented certain new and useful Improvements in Furnaces, of which the following is a specification.

The present invention has relation to improvements in heat generating furnaces and pertains more particularly to the type of electric heating apparatus, wherein the caloric is produced by electrically heating a series of core laminations and subsequently maintaining the temperature, after the source of energy has been shut off.

The principal object of the invention is to provide a furnace which derives its heating influence from highly heated core elements and in which the temperature of the furnace is maintained for a predetermined period, after the discontinuation of the electric energy.

A further object is to provide for the circulation of water entirely around the heating element and the subsequent utilization of the same, as a heating medium for buildings and the like.

A still further object is to provide a water heating system in which the heating medium consists of a plurality of electrically heated grids, so positioned with relation to the furnace, as to retain the high temperature value after the current has been switched off.

With these and other objects in view, the invention consists in the construction, combination and arrangement of parts as will be hereinafter fully described, illustrated in the accompanying drawings, and pointed out in the claims hereunto appended.

Fig. 4 is a top plan view of Fig. 1 with the cover plate and mineral packing removed.

Fig. 5 is a horizontal section on line $d$—$d$ of Fig. 1.

Fig. 6 is a fragmental elevation of the furnace and the electrical connections schematically shown.

Referring to the drawings like numerals designate like parts in the various drawings.

Figure 1:
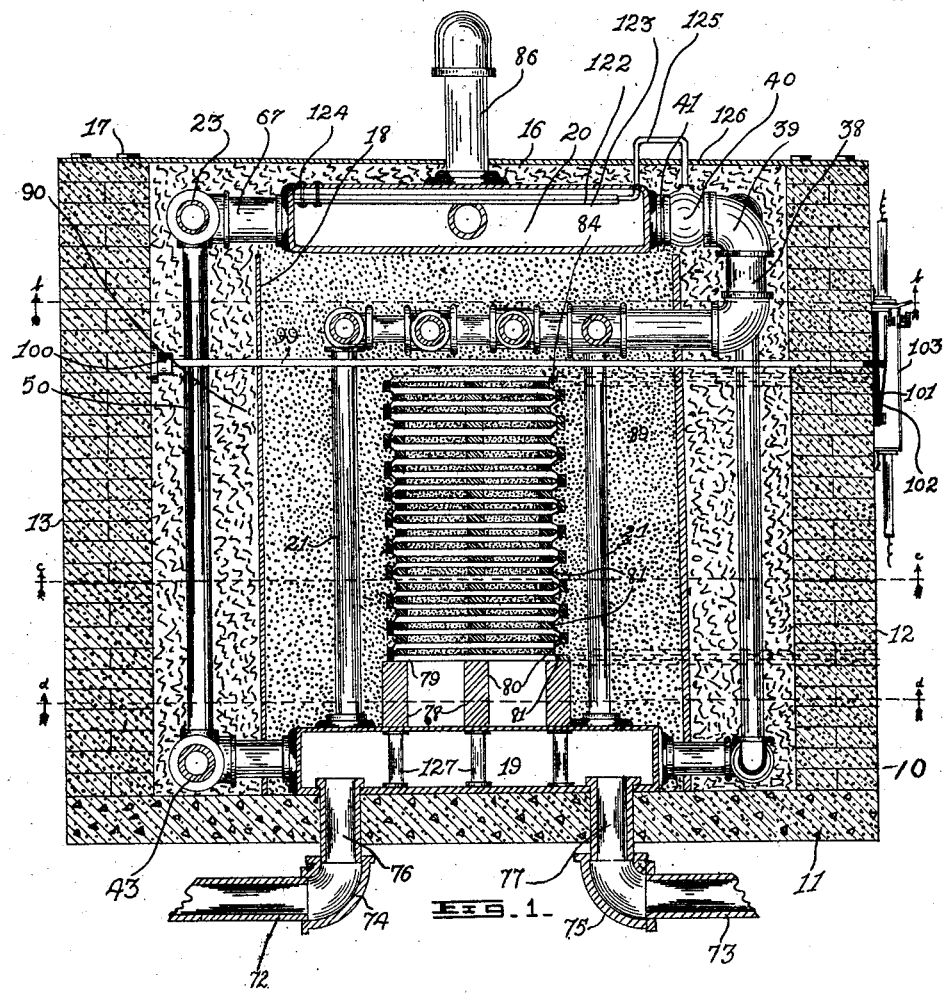
Figure 1 is a longitudinal vertical section of the improved furnace on line $a$—$a$ of Fig. 4.
Figure 2:
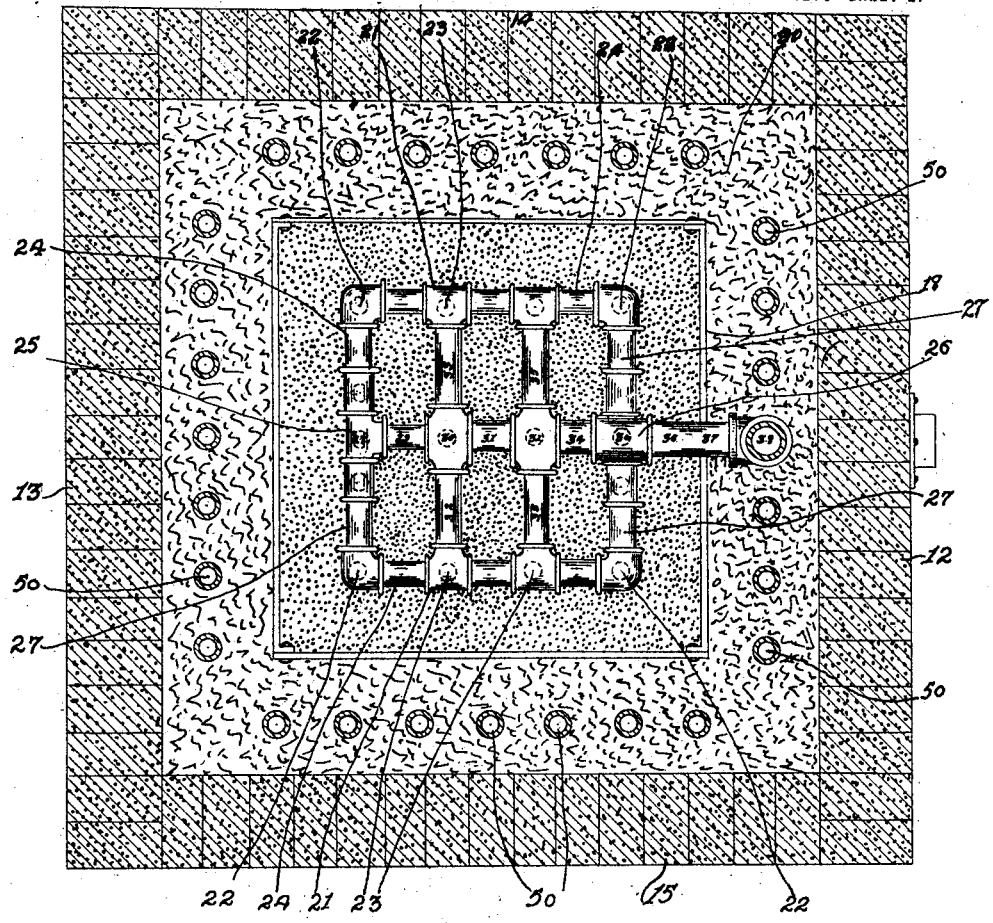
Fig. 2 is a horizontal section on line $b$—$b$ of Fig. 1.
Figure 3:
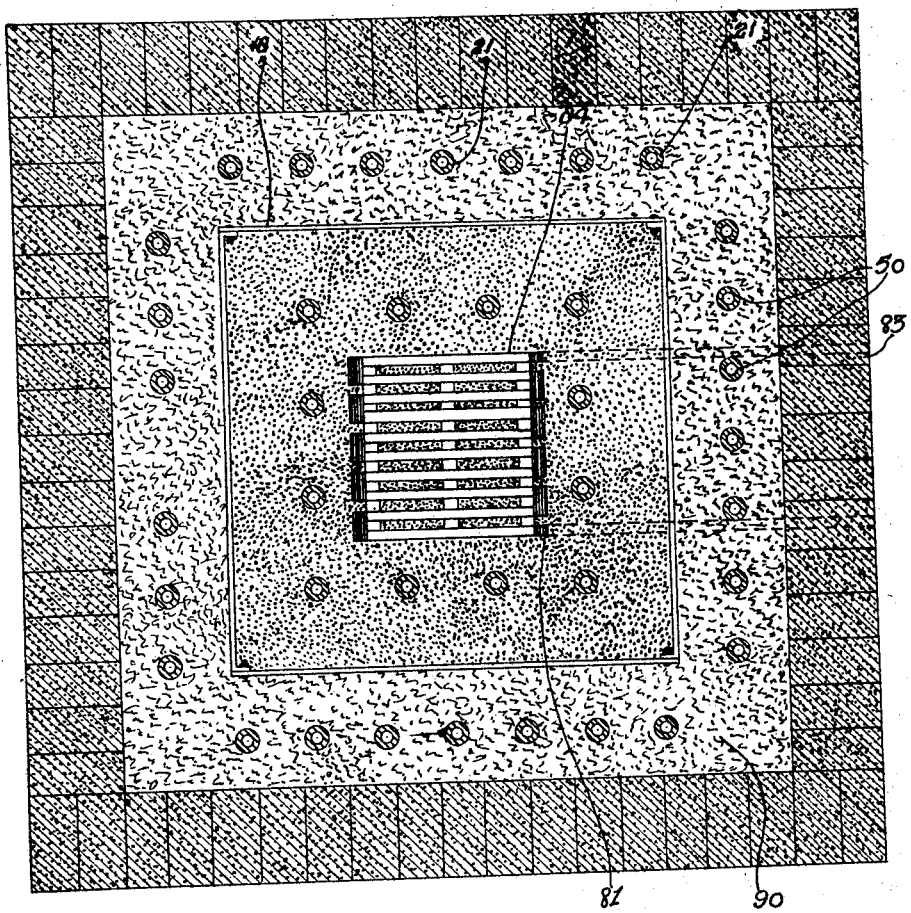
Fig. 3 is a horizontal section on line $c$—$c$ of Fig. 1.
Figure 3:
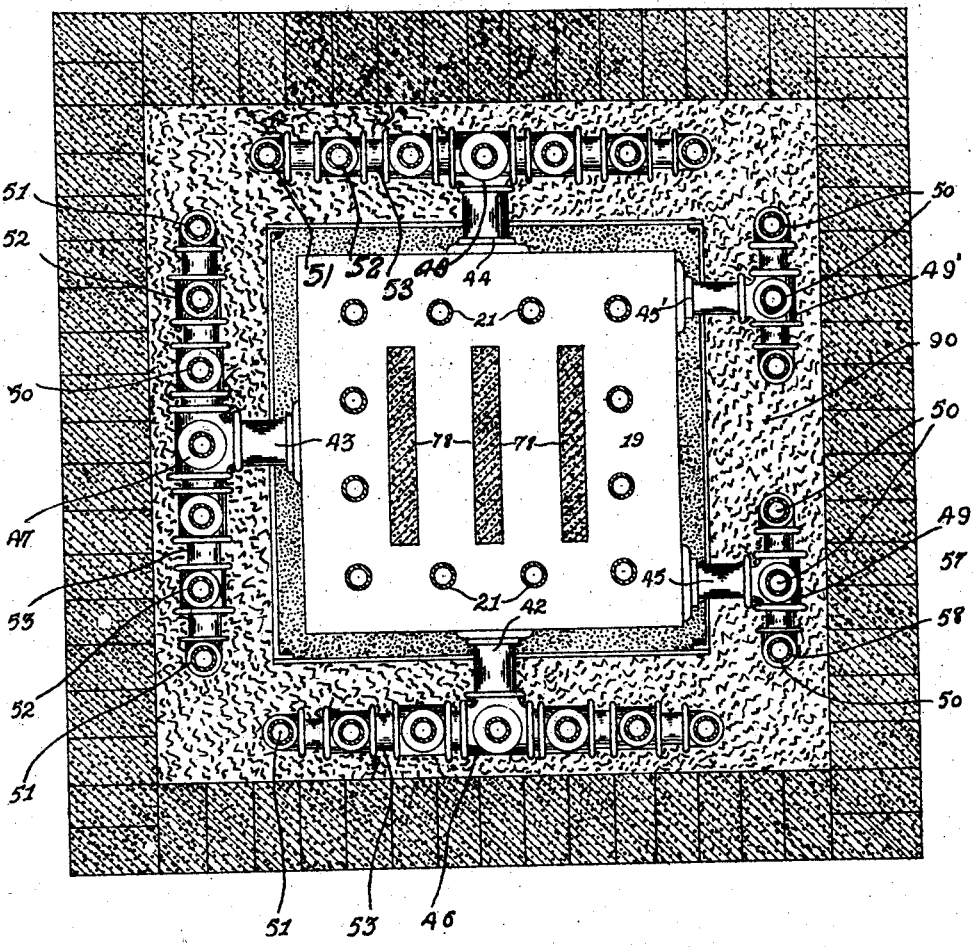

Due to the increasing scarcity of coal and the consequent high cost of the same, the utilization of electricity as a heating medium is becoming an economic necessity. Likewise, great cleanliness of maintenance is effected, due to the elimination of smoke, soot and coal ashes and further the economic factor is argumented, by reason of the simple operation of electric furnaces, for the attention of which a qualified engineer is not necessary.

Further, an electric heating furnace may be heated to the desired degree and the caloric may be maintained at even temperature for some time after the heating current is discontinued, thereby effecting a saving of fuel supply.

Likewise, there will be effected economy in electric energy by only utilizing the energy at stated times for the heating of the furnace. The current so utilized is taken from the supply after the peak load has been reduced.

As will be understood, the kilowatt rate is computed upon the peak load each day and in the present apparatus the current utilized is taken after the peak load has been lowered.

As the utilization of water power is becoming more predominant electrical energy at a greater decreased cost, will supersede the use of coal and with the object of taking advantage of this comparatively cheap and clean heating medium, I have provided a furnace which is indicated upon the drawings by the numeral 10.

The improved furnace, comprises a concrete base 11, front and rear walls 12 and 13 and side walls 14 and 15. The walls are constructed preferably of two thicknesses of firebrick and a metallic top plate 16 is secured to the walls at the upper end of the furnace by anchor bolts 17.

Disposed within the interior of the furnace is a metallic casing 18, the wall plates of which are spaced from the walls of the furnace proper.

A reservoir or drum 19, is disposed wholly within the lower part of the casing 18 and rests upon the base 11, and a drum 20 is disposed in the upper end of said furnace above casing 18.

Pipes 21 communicate with the upper part of water drum 19 and extend upwardly in spaced relation therefrom and are connected together by the three-way unions 22 and 23 and short pipes 24 at two sides and the three-way unions 25 and 26 and the short pipes 27, on the opposite two sides. The unions 25 are connected to a three-way union 28, and a pipe connection 29 leads to a four-way union 30. This union 30 is connected by pipe 31, to a similar union 32 and said unions 30 and 32 are connected by pipes 33 with the four way unions 23. A pipe connection 34 connects union 32 with a four-way union 35, which at the sides is connected to the unions 26 which are in turn connected to short pipes 27, and end unions 22. The above unions and pipes form a manifold above the pipes 21.

A large pipe 36 has elbow connection 37 with a pipe 38 and pipe 38 is in turn connected by the elbow 39 to one post of a globe valve 40, having a slip connection 41 which opens directly into the forward end of the upper reservoir or drum 20.

Large pipes 42, 43, and 44 and smaller pipes 45 and 45′ lead into and communicate with the interior of the lower drum 19 and are connected to the four-way unions 46, 47, 48, 49 and 49′. A series of units of seven vertical pipes 50, extend in spaced relation at three sides of the furnace between the casing 18 and the inner walls of the said furnace. The first mentioned pipes 50 are connected together by unions 51 and 52 and short pipes 53 and are similarly connected at their upper ends by the unions 54 and 55 and short pipes 56. Likewise the other pipes 50 comprising the units of three are connected at their lower ends by coupling pipes 57 and elbows 58, the coupling pipes 57 being connected to the fourway unions 49 and 49′ while their upper ends are connected to the unions 59 and 60, elbows 61 and 62 and short pipes 63.

The unions 64, 65 and 66 are connected to the pipe connections of the upper ends of each of the series of seven of pipes 50. Pipes 67, 68 and 69 open into three sides of the upper reservoir 20, while pipes 70 and 71 likewise open therein leading from each of the units of three pipes 50.

Water inlet pipes 72 and 73 have elbow connections 74 and 75 with the vertical pipes 76 and 77, entering through the bottom of the lower reservoir 19. These pipes lead from a suitable water supply and water is constantly entering reservoir 19 and circulating upwardly through the pipes 21 and 50.

Disposed centrally of the furnace and mounted on the fibre supports 78, on the top of the lower reservoir 19, are the grids 79 preferably constructed of grey cast iron. These grids or laminations 79, are in the form of continuous horizontally disposed elongated rectangular bars having their alternate ends bent inwardly and welded to the inwardly bent end of the next succeeding grid. These grids 79 are held in spaced relation by strips 80 of vulco-asbestos. The grid units are assembled in juxtaposed relation as illustrated in Fig. 1, and the end of each alternating bar is welded to the alternating bar of the next succeeding grid, and are spaced apart by the end strips 81 of vulco-asbestos. This stack of grids as heretofore stated, is located centrally of the furnace and is entirely enclosed by the vertically disposed pipes 21 leading from the top of the lower reservoir 19. The free end 81 of the lower grid 79 is connected to a cable 82 leading from the source of electrical supply or generator, and a cable 83 is connected on its inner end to the free end 84 of the top grid, and leads back to the said generator. Connected to the top of the upper reservoir or drum 20 by elbows 85 and 86, are the hot water supply pipes 87 and 88 leading to the radiators in the structure to be heated.

The space within the casing 18 surrounding both the vertical pipes 21 and the heating element comprising the stack of grids 79, is filled with silicate sand 89, which also contacts with the lower surface of the upper reservoir 20. The space between the furnace walls and the casing 18 is packed with mineral wool 90, which likewise, is packed around the upper part of reservoir 20.

The grids 79, are capable of high resistance and consequently are heated to a high degree, and the heat radiations are primarily imparted to the water in the vertical pipes 21, which has passed upward from the lower reservoir 19. As the water in pipes 21 attains a relatively high temperature, it passes upwardly through the manifold, formed by the elbows, unions and pipes, as heretofore described and through the large pipe 36 and connections into the upper reservoir 20.

Meanwhile a portion of the water from the lower reservoir 19 passes outwardly through the large pipes 42, 43 and 44 and 45 and 45′ into the large pipes 50, and upwardly to combine and pass through the upper large pipes 67, 68, 70 and 71 and finally enters the upper reservoir 20.

During the circulation of the water in the manner stated, the temperature of the same has been raised and when it mingles with the hot water in the upper reservoir 20, it has attained approximately the same degree of temperature. This hot water then passes out through pipes 85 and 86 to the radiators in the structure to be heated.

In this manner, every pipe, union and coupling through which the water is circulated is subjected to the influence of the heat generated in and radiated from the grids 79.

For the control of the circuits leading from the source of electrical supply, I provide as schematically illustrated in Fig. 6, the following system: A large transformer 91, comprises the primary and secondary windings 92 and 93. The main lead 94 from the generator 95 is connected to the primary winding 92 of the transformer 91, and the said generator is likewise connected to return lead 96 which is in turn connected to a switch 97, the contacts of which are immersed in oil. A lead 98 passes from the other terminal of the switch 97 and is connected to the other terminal of the transformer coil 92. Cables 82 and 83 leading to and from the heating grids 79 are connected to the terminals of the secondary transformer winding 93. The current from the generator normally passes through the lead 94 and energizes the primary coil 92, of the transformer and returns through wire 98, switch 97 and lead 96 to the generator to complete the circuit. The secondary coil 93 is energized by the primary coil and the current is passed through cable 82 to the heating element comprising the grids 79, and back through the cable 83 to the other terminal of the secondary winding 93 and completes the circuit.

A thermostatic metal bar 99, extends through the furnace above the grid stack and has its rear end loosely mounted in a retaining member 100 secured to the rear wall 13 of the furnace.

The free end of bar 99 is slidably mounted in the front wall 13 of the furnace, and passes through a fibre plate 101, secured in any appropriate manner to the outer surface of the front wall of the furnace. This thermostatic bar 99 is capable of expansion and contraction by the heat generated in the furnace.

When the bar 99 reaches a predetermined temperature, the same will expand longitudinally and move outwardly against the blade 102 of a contact switch 103.

This switch 103 is connected by wire 104 with a relay 105 and the current passes through the relay coil 106 and through wire 107 to the return terminal of the secondary coil 108, of the control transformer 109. A wire 110 leads from the out terminal of the secondary coil 108, and is connected to the lower terminal of the contact switch 103.

When the relay 105 is energized, the armature 111 is moved inwardly of the coil 106 and contact bar 112 engages the terminals 113, causing a current to flow over wire 114, to the secondary coil 108 of the control transformer. From the other terminal 113, the current flows through wire 115 to the coil 116 of the oil switch 97. The current then passes through wire 117 to the terminal of the secondary coil of the control transformer 109, thus completing the circuit. The coil 116 of the oil switch 97 is thus energized and resultantly the armature 117 is elevated and breaks the main circuit leading from the generator.

For turning on the current at a predetermined time, I employ a time switch 119, one terminal of which is connected to one of the terminals 113 of the relay 105, by a wire 119 and the wire 114 leads to the secondary winding 108 of control transformer 109. The other terminal of the clock switch 118 is connected by wire 121, the terminal of the coil 116 of oil switch 97 and the current returns through wire 117 to the secondary winding 108 of the control transformer 109.

For regulating the flow of hot water from the inner vertical pipes 21 to the upper reservoir or drum 20 I provide a thermostatic device comprising the metallic blades 122 and 123 which are welded together and secured by rivets 124 to the upper wall of the reservoir 20 on the interior thereof. The free end of this thermostatic element is connected to an inverted U-shaped rod 125, the end 126 of which is connected to the globe valve 40. The thermostatic element, when the temperature of the water in reservoir 20 reaches the boiling point, will expand and actuate the valve 40 and close the same against the entrance of the water to the reservoir. The lowering of the temperature of the water would likewise act to open the valve.

It is obvious, that I have provided a furnace, wherein heating element is maintained at desired temperature, and in which, the caloric is retained for a maximum period after the current has been cut off. Resultantly, this heat is stored within the furnace and utilized for heating the water within the reservoirs, pipes and the connections therefor.

For reinforcing the lower reservoir 19 at its central part, I have provided posts 127, which are arranged directly under the grid stack.

These grids 79, comprising the heating elements, are preferably constructed of some good rheostatic metal, such as grey cast iron and are separated by heat retaining insulating strips, as heretofore described.

From the foregoing it is thought that the construction of my invention will be clearly understood, and, therefore, a more extended explanation has been omitted.

What I claim as new is:

1. A heat generating furnace, comprising a casing, water reservoirs mounted within said casing and connected with a water supply, heat generating elements arranged in said casing, a series of pipes connecting said reservoirs and surrounding said heat generating elements and means for heating said elements.

2. A heat generating furnace comprising a casing, water reservoirs arranged within said casings water inlet and outlets communicating with said reservoirs, a plurality of water pipes connecting said reservoirs, a series of metal grids surrounded by said water pipes, said grids connected with a source of electric supply for heating the water in said pipes and said reservoirs, and means for heating a secondary supply of water.

3. A heat generating furnace comprising a casing, water reservoirs arranged within said casings water inlet and outlets communicating with said reservoirs, a plurality of water pipes connecting said reservoirs, a series of metallic grids surrounded by said water pipes, said grids connected with a source of electric supply for heating the water in said pipes and said reservoirs, means for heating a secondary supply of water and means for uniting the secondary heated water with the water from said reservoir for circulation through a heating system.

4. A hot water generating system, the combination with a furnace including a cold water supply, of a water receiving reservoir arranged in said furnace, a hot water reservoir, pipes connecting said reservoirs, a plurality of heat generating members surrounded by said pipes, insulating elements disposed between said generating members, a source of electric energy for heating said generating members and means for circulating the heated water from said pipes to the hot water reservoir.

5. A hot water generating system, the combination with a furnace including a cold water supply, of a water receiving reservoir arranged in said furnace, a hot water reservoir, pipes connecting said reservoirs, a plurality of heat generating members surrounded by said pipes, insulating elements arranged between said heat generating members, a source of electric energy for heating said generating members, means for circulating the heated water from said pipes to the hot water reservoir, and a secondary water heating system associated with the first mentioned system.

6. A hot water generating system, the combination with a furnace including the water supply, a cold water receiving reservoir, a hot water receiving reservoir, pipes leading from the cold water reservoir to the hot water reservoir, a series of metal plates arranged in said furnace and surrounded by said pipes, insulating elements interposed between said plates, means for heating said plates and means for heating the water in circulation through said pipes.

7. A hot water generating system, the combination with a furnace including the water supply, a cold water receiving reservoir, a hot water receiving reservoir, pipes leading from the cold water reservoir to the hot water reservoir, a series of metal grids arranged in said furnace and surrounded by said pipes, insulating elements interposed between said grids, means for heating said grids, means for heating the water in circulation through said pipes, and pipes connected to said furnace for holding a secondary supply of water to be subjected to the said heating means.

8. An electric water heating furnace comprising a casing, a reservoir communicating with the water supply, a hot water reservoir, a plurality of pipes connecting said reservoirs, heat generating members surrounded by said pipes, insulating elements interposed between the said generating members, means for heating said generating members and means for heating an auxiliary supply of water for admixture with the water from the hot water reservoir.

9. An electric water heating system, the combination with a furnace including cold and hot water supply reservoirs, a plurality of pipes connecting said reservoirs, a series of metallic grids arranged in juxtaposed relation between said pipes, said grids adapted to be electrically energized for heating said pipes and reservoirs, pipes connected to said reservoirs and adapted to be heated to furnish auxiliary hot water for admixture with the water from the hot water reservoir.

10. An electric heating system for buildings, comprising a casing, a reservoir communicating with the water supply, a hot water reservoir arranged in said casing, a plurality of pipes connecting said reservoirs, a column of metal grids disposed between said reservoirs and surrounded by said pipes, said grids adapted to be electrically energized after the peak load of the electrical supply, to maintain the temperature of the circulating medium in the furnace, and the said circulating medium being circulated through the building to distribute its heat units and returning to said furnace.

11. An electric water heating furnace for buildings comprising a casing, a reservoir communicating with water supply pipes, a hot water reservoir, a plurality of vertical pipes connecting said reservoirs, pipes connected to the hot water reservoir and leading to the heating system of the building, by pass pipes connected to the inlet and outlet pipes, a water column disposed within said casing and connected to said by pass pipes, a plurality of grids surrounded by said vertical pipes, said grids adapted to be heated by an electrical supply and means for heating the water in its circulation from the inlet reservoir to the outlet reservoir.

12. An electric water heating furnace for buildings comprising a casing, a reservoir communicating with water supply pipes, a hot water reservoir, a plurality of vertical pipes connecting said reservoirs, pipes connected to the hot water reservoir and leading to the heating system of the building, by pass pipes connected to the inlet and outlet pipes, a water column disposed within said casing and connected to said by pass pipes, a plurality of grids surrounded by said vertical pipes, said grids adapted to be heated by an electrical supply, means for heating the water in its circulation from the inlet reservoir to the outlet reservoir, and means for heating the water in said column and uniting it with the water from the outlet reservoir.

13. An electric water heating furnace comprising a casing, inlet and outlet reservoirs connected with a water supply, pipes connecting said reservoir, a plurality of metallic grids engaging said pipes, electric generating elements connected to said grids, said elements connected with a source of electrical supply, said grids adapted to be heated to a high degree by said elements, a heat absorbent packing completely surrounding said pipes and grids, and means for retaining the heat generated within said casing, after the electrical supply is cut off.

14. An electric water heating furnace comprising a casing, inlet and outlet reservoirs connected with a water supply, pipes connecting said reservoir, a plurality of metallic grids engaging said pipes, electric generating elements connected to said grids, said elements connected with a source of electrical supply, said grids adapted to be heated to a high degree by said elements, a heat absorbent packing completely surrounding said pipes and grids, means for retaining the heat generated within said casing, after the electrical supply is cut off, and means for heating an auxiliary water supply and uniting the same with the outlet supply from the outlet reservoir.

15. A water heating furnace comprising a casing, inlet and outlet reservoirs arranged in said casing, said inlet reservoir connected with inlet water supply pipes, the outlet reservoir connected to outlet pipes, a plurality of radially disposed pipes connecting said reservoirs, a plurality of rectangular metallic grids forming a column surrounded by and engaging said last mentioned pipes, said grids being connected with a source of electric energy, a heat absorbing packing arranged within said casing and surrounding said pipes and grids, by pass pipes connected to the inlet and outlet supply pipes, and a water column arranged in said casing and connected with said by pass pipes, for circulating a supply of water through the casing to be heated by the said grids.

16. A water heating furnace comprising a casing, inlet and outlet reservoirs arranged in said casing, said inlet reservoir connected with inlet water supply pipes, the outlet reservoir connected to outlet pipes, a plurality of radially disposed pipes connecting said reservoirs, a plurality of rectangular metallic grids forming a column surrounded by and engaging said last mentioned pipes, said grids being connected with a source of electric energy, a heat absorbing packing arranged within said casing and surrounding said pipes and grids, by pass pipes connected to the inlet and outlet supply pipes, a water column arranged in said casing and connected with said by pass pipes, for circulating a supply of water through the casing to be heated by the said grids, and means for maintaining the temperature of the furnace after the electrical supply has been cut off.

17. A water heating furnace for structures, comprising a casing, a water inlet reservoir arranged in the base of said casing, an outlet reservoir arranged in the top of said casing, said inlet reservoir connected to inlet supply pipes, said outlet reservoir connected to the water circulation system of the structure, a plurality of pipes connecting said reservoirs, a series of grids, surrounded by said last mentioned pipes, said grids adapted to be heated by electrical energy, the water circulating through said last mentioned pipes adapted to be heated by said grids, a heat retaining packing surrounding said pipes and grids, a water column disposed in said casing and by pass pipes connecting said column with the inlet and outlet water supply pipes and the water in said column adapted to be heated and united with the outlet supply.

18. A furnace for hot water heating systems for structure comprising a casing, reservoirs arranged within said casing, water inlet pipes connected to one of said reservoirs, water outlet pipes connecting the other of said reservoirs with the heating system of the structure to be heated, pipes connecting said reservoirs, heating elements connected to a source of electrical energy, said last mentioned pipes surrounding said heating elements and means for insulating said heating elements.

19. A furnace for hot water heating systems, comprising a casing having a base, a water inlet reservoir mounted on said base, a hot water reservoir secured to the top of said casing, pipes connected to said inlet reservoir and leading to a water supply, pipes connected to the outlet reservoir and leading to the heating system, a series of pipes arranged within said casing and connecting said reservoirs, said pipes adapted for the circulation of water through the casing to be heated, a plurality of metallic grid plates enclosed by said last mentioned pipes, said grid plates connected to a source of electrical supply for heating the same and a packing surrounding said pipes and grids and adapted to retain the heat after the electric energy has been cut off.

20. A furnace for hot water heating systems, comprising a casing having a base, a water inlet reservoir mounted on said base, a hot water reservoir secured to the top of said casing, pipes connected to said inlet reservoir and leading to a water supply, pipes connected to the outlet reservoir and leading to the heating system, a series of pipes arranged within said casing and connecting said reservoirs, said pipes adapted for the circulation of water through the casing to be heated, a plurality of metallic grid plates enclosed by said last mentioned pipes, said grid plates connected to a source of electrical supply for heating the same a packing surrounding said pipes and grids, and adapted to retain the heat after the electric energy has been cut off, and means for circulating the water through the said furnace casing.

In testimony whereof I affix my signature in the presence of two witnesses.

ROBERT P. MOODIE.

Witnesses:
M. McMILLAN,
E. LITLE.